United States Patent
Bartling et al.

(10) Patent No.: US 12,278,886 B2
(45) Date of Patent: *Apr. 15, 2025

(54) HYBRID SERIAL RECEIVER CIRCUIT

(71) Applicant: Apple Inc., Cupertino, CA (US)

(72) Inventors: Ryan D. Bartling, Sunnyvale, CA (US); Jafar Savoj, Sunnyvale, CA (US); Brian S. Leibowitz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/313,729

(22) Filed: May 8, 2023

(65) Prior Publication Data

US 2023/0283449 A1    Sep. 7, 2023

Related U.S. Application Data

(63) Continuation of application No. 17/482,302, filed on Sep. 22, 2021, now Pat. No. 11,689,351.

(51) Int. Cl.
*H04L 7/00* (2006.01)
*H04L 25/03* (2006.01)

(52) U.S. Cl.
CPC .......... *H04L 7/0079* (2013.01); *H04L 7/0016* (2013.01); *H04L 25/03878* (2013.01)

(58) Field of Classification Search
CPC ..... H04L 7/0079; H04L 7/0016; H04L 25/02; H04L 25/03; H04L 25/03878; H04L 25/0272; H04B 1/16

See application file for complete search history.

(56) References Cited

U.S. PATENT DOCUMENTS

| | | | |
|---|---|---|---|
| 8,995,596 B1 | 3/2015 | Loke et al. | |
| 9,385,859 B2 | 7/2016 | Kuan et al. | |
| 9,461,654 B1* | 10/2016 | Kou | H04L 7/0016 |
| 9,537,617 B2 | 1/2017 | Chandrasekaran et al. | |
| 9,584,345 B1 | 2/2017 | Baecher et al. | |
| 9,954,576 B2 | 4/2018 | Chada et al. | |
| 11,088,818 B1 | 8/2021 | Fang et al. | |
| 11,689,351 B2* | 6/2023 | Bartling | H04L 7/0079 375/229 |
| 2009/0161798 A1* | 6/2009 | Wong | H04B 1/16 341/155 |
| 2015/0092898 A1 | 4/2015 | Lee et al. | |

(Continued)

OTHER PUBLICATIONS

International Search Report and Written Opinion in PCT Appl. No. PCT/US2022/042619 mailed Jan. 2, 2023, 9 pages.

*Primary Examiner* — Betsy Deppe
(74) *Attorney, Agent, or Firm* — Kowert, Hood, Munyon, Rankin & Goetzel, P.C.; Dean M. Munyon

(57) ABSTRACT

A hybrid receiver circuit included in a computer system may include both an analog and an ADC-based receiver circuit. A front-end circuit generates different equalized signals based on received signals that encode a serial data stream that includes multiple data symbols. Depending on a baud rate of the serial data stream, either the digital receive circuit or the analog receiver circuit is activated to provide the desired performance and power consumption over the range of possible baud rates. The ADC-based receiver circuit may include multiple analog-to-digital converter circuits with different resolutions that can be selected for different baud rates.

20 Claims, 11 Drawing Sheets

(56) References Cited

U.S. PATENT DOCUMENTS

| | | |
|---|---|---|
| 2015/0207581 A1 | 7/2015 | Mangano et al. |
| 2015/0249477 A1 | 9/2015 | Nedovic |
| 2017/0171006 A1 | 6/2017 | Baecher et al. |
| 2019/0068397 A1 | 2/2019 | Chen |
| 2020/0212943 A1 | 7/2020 | Banin et al. |
| 2021/0226639 A1 | 7/2021 | Han et al. |

\* cited by examiner

HYBRID SERIAL RECEIVER CIRCUIT

The present application is a continuation of U.S. application Ser. No. 17/482,302, entitled "Hybrid Serial Receiver Circuit," filed Sep. 22, 2021, now U.S. Pat. No. 11,689,351 B2, the disclosure of which is incorporated by reference herein in its entirety.

BACKGROUND

Technical Field

This disclosure relates to the field of high-speed communication interface design and, in particular, to the use of a hybrid analog/analog-to-digital converter (ADC) based receiver circuit.

Description of the Related Art

Computing systems typically include a number of interconnected integrated circuits. In some cases, the integrated circuits may communicate using communication channels or links to transmit and receive data bits. The communication channels may support parallel communication, in which multiple data bits are transmitted in parallel, or serial communication, in which data bits are transmitted one bit at a time in a serial fashion.

The data transmitted between integrated circuits may be encoded to aid in transmission. For example, in the case of serial communication, data may be encoded to provide sufficient transitions between logic states to allow for clock and data recovery circuits to operate. Alternatively, in the case of parallel communication, the data may be encoded to reduce switching noise or to improve signal integrity.

During transmission of the data, the physical characteristics of the communication channel may attenuate a transmitted signal associated with a particular data bit. For example, the impedance of wiring included in the communication channel or link may attenuate certain frequency ranges of the transmitted signal. Additionally, impedance mismatches between wiring included in the communication channel and devices coupled to the communication channel may induce reflections of the transmitted signal, which may degrade subsequently transmitted signals corresponding to other data bits.

SUMMARY OF THE EMBODIMENTS

Various embodiments for processing a serial data stream are disclosed. Broadly speaking, a hybrid receiver circuit includes a front-end circuit, an ADC-based receiver circuit, an analog receiver circuit, and a clock circuit. The front-end circuit may be configured to generate an equalized signal using at least one signal that encodes a serial data stream that includes a plurality of data symbols. The ADC-based receiver circuit can include at least one analog-to-digital converter circuit and may be configured, based on a baud rate of the serial data stream, to generate a first plurality of recovered data symbols using the first equalized signal and a plurality of first clock signals. The analog receiver circuit may be configured, based on the baud rate of the serial data stream, to generate a second plurality of recovered data symbols using the second equalized signal and a plurality of second clock signals. The clock circuit may be configured to generate the plurality of first clock signals using first control information determined during the generation of the first plurality recovered data symbols, and generate the plurality of second clock signals using second control information determined during the generation of the second plurality of recovered data symbols.

DETAILED DESCRIPTION OF EMBODIMENTS

Figure 1:
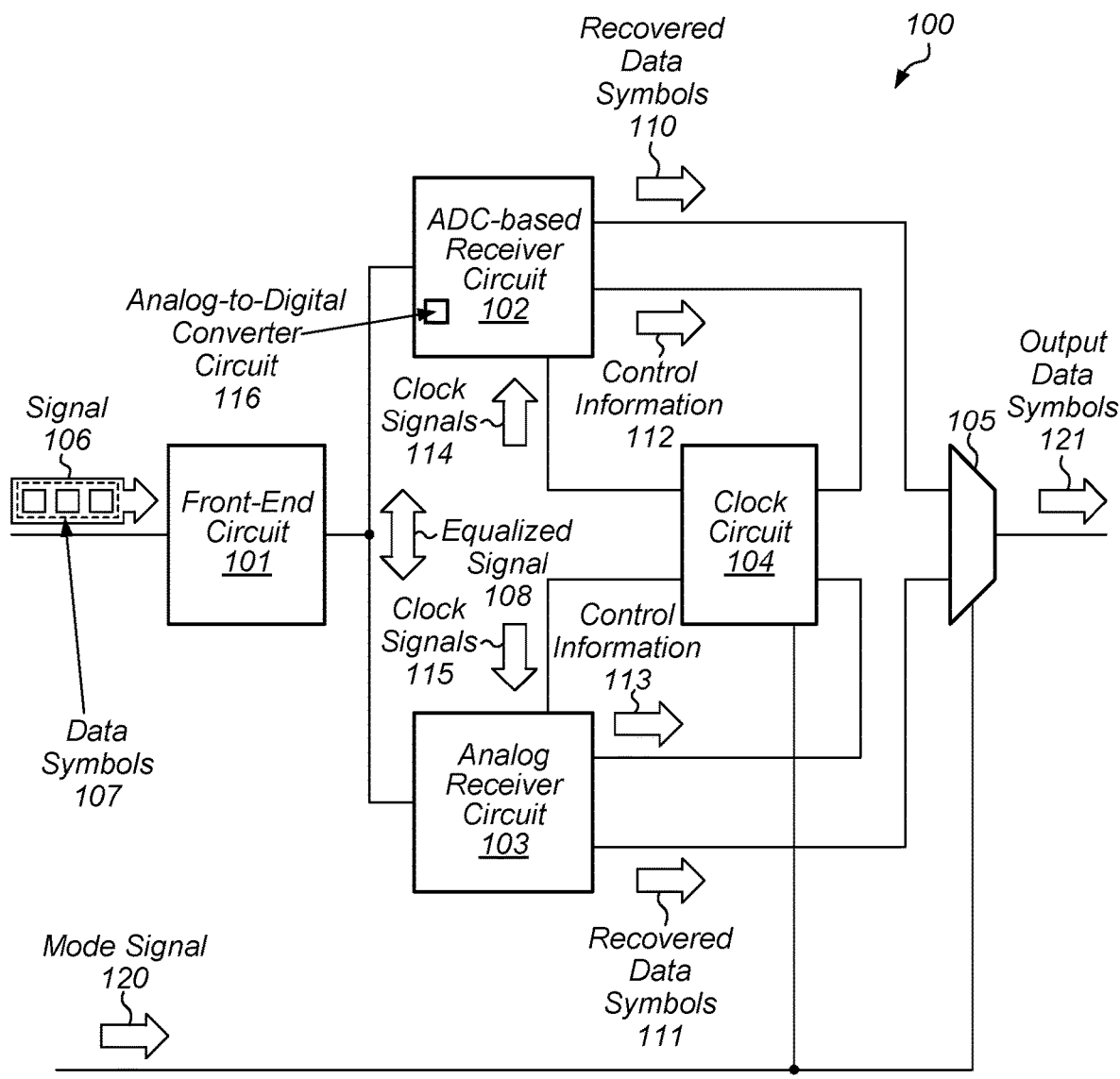
FIG. 1 is a block diagram of an embodiment of a hybrid receiver circuit for a computer system.

A computing system may include one or more integrated circuits, such as, e.g., a central processing unit (CPU) and memories. Each one of the integrated circuits of the computing system may communicate through either a serial or parallel interface. In a parallel interface, multiple data bits are communicated simultaneously, while in a serial interface, data is communicated as a series of sequential single data bits. When employing a serial interface to communicate data between two devices included in a computing system, the data may be transmitted according to different protocols. For example, the data may be transmitted using return to zero (RZ), non-return to zero (NRZ), pulse amplitude modulation (PAM), or any suitable combination thereof.

Serial data streams are often transmitted without an accompanying clock signal. In such cases, a clock signal is recovered from the serial data stream (in a process referred to as "clock recovery") and used for sampling the serial data stream to determine the values of the included data symbols (in a process referred to as "data recovery"). Various techniques can be employed to recover both the data and the clock signal. For example, a receiver circuit may generate a clock signal whose frequency is approximately the same as that of a clock signal used to create the data stream. A phase-locked loop circuit may then be used to phase align the clock signal with transitions in the serial data stream. Alternatively, the serial data stream may be oversampled, i.e., sampled at a higher frequency than that of the clock signal used generate the serial data stream.

Receiver circuits for serial data streams may be analog-based, or they may employ analog-to-digital converter (ADC) circuits. ADC-based receiver circuits convert an equalized version of input data signals into bits in the digital domain, allowing additional processing (e.g., feed-forward equalization) to be performed as digital signal processing operations.

In new interconnect standards, receiver circuits are required to support a wide range of baud rates. As used and defined herein, baud rate (or "symbol rate") is a rate at which information is transmitted via a communication channel. For example, in PCIE, the data rates can vary from 2.5 Gbaudps to 32 Gbaudps. At the lower end of such a range, an analog-based received circuit can provide a power efficient solution to sample a signal transmitted along the communication channel. As the baud rate of the signal increases, however, the analog-based receiver circuit may not provide the performance needed to recover the data consistently. At the high baud rates, ADC-based receiver circuits can provide the performance needed to sample the signal, but are power inefficient at lower baud rates. There is no single receiver circuit topology that covers the needed data rate range without sacrificing either performance or power.

The embodiments illustrated in the drawings and described below may provide techniques for using a hybrid receiver circuit that includes both an analog-based receiver circuit and an ADC-based receiver circuit to sample a signal that encodes a serial data stream. Under particular conditions (e.g., low baud rates, low-loss communication channels, etc.), the analog-based receiver circuit can be enabled to sample the signal in a power efficient fashion. In response to a change in the conditions (e.g., an increase the baud rate of the received data stream), the analog-based receiver circuit can be disabled and the ADC-based receiver circuit enabled to provide the needed performance at the new conditions.

A block diagram depicting an embodiment of a hybrid receiver circuit is depicted in FIG. 1. As illustrated, hybrid receiver circuit 100 includes front-end circuit 101, ADC-based receiver circuit 102, analog receiver circuit 103, clock circuit 104, and multiplex circuit 105.

Front-end circuit 101 is configured to generate equalized signal 108 using signal 106. In various embodiments, signal 106 encodes a serial data stream that includes data symbols 107. Although front-end circuit 101 is depicted as generating a single equalized signal that is used by both ADC-based receiver circuit 102 and analog receiver circuit 103, in other embodiments, front-end circuit 101 may be configured to generate different equalized signals for each of ADC-based receiver circuit 102 and analog receiver circuit 103.

In some embodiments, signal 106 may encode data symbols 107 according to one of various symbol encodings. For example, signal 106 may be transmitted according to RZ, NRZ, PAM3, or any other suitable symbol encoding. It is noted that although a single signal is depicted as encoding data symbols 107, in other embodiments, multiple signals may be employed to encode data symbols 107. For example, in some cases, two signals may be employed to encode data symbols 107 when differential signaling standards are used.

ADC-based receiver circuit 102 includes analog-to-digital converter circuit 116, and is configured, based on the baud rate of the serial data stream that includes data symbols 107, to generate recovered data symbols 110 using clock signals 114 and equalized signal 108. As described below, ADC-based receiver circuit 102 may include multiple analog-to-digital converter circuits that sample equalized signal 108 with different resolutions. In various embodiments, different ones of the multiple analog-to-digital converter circuits may be employed based on the baud rate of the serial data stream that includes data symbols 107.

Analog receiver circuit 103 is configured, based on the baud rate of the serial data stream that includes data symbols 107, to generate recovered data symbols 111 using clock signals 115 and equalized signal 108. As described below, analog receiver circuit 103 may be implemented using primarily analog circuits that perform various functions (e.g., decision-feedback equalization) in the analog domain. It is noted that a power consumption of analog receiver circuit 103 may be less than a power consumption of ADC-based receiver circuit 102 at baud rates less than a threshold value. Although only a single analog receiver circuit is depicted in the embodiment of FIG. 1, in other embodiments, additional analog receiver circuits may be employed, each configured to be activated under corresponding sets of conditions (e.g., input data stream baud rate, channel conditions, and the like).

Clock circuit 104 is configured to generate clock signals 114 using control information 112, and to generate clock signals 115 using control information 113. In some embodiments, clock circuit 104 may be configured to generate either clock signals 114 or clock signals 115 based on mode signal 120. For example, clock circuit 104 may be configured, in response to a determination that mode signal 120 is a particular value, to generate clock signals 114. Alternatively, clock circuit 104 may be configured, in response to a determination that mode signal 120 is a different value, to generate clock signals 115. Although clock signals 114 and clock signals 115 are depicted as being a single wire, in various embodiments, clock signals 114 and clock signals 115 may include multiple clock signals with respective phases. It is noted that a value of mode signal 120 may corresponding to a particular set of conditions (e.g., input data stream baud rate, channel conditions, and the like). A change in one or more of the conditions, can result in a different value for mode signal 120.

Clock circuit 104 may be configured, in response to a determination that the baud rate of the serial data stream equals certain baud-rate values, to generate clock signals 114, otherwise generate clock signals 115. In various embodiments, the determination of the baud rate may be performed during an initialization procedure associated with a communication channel to which hybrid receiver circuit 100 is coupled.

In various embodiments, ADC-based receiver circuit 102 is configured to determine control information 112 during the generation of recovered data symbols 110. In a similar fashion, analog receiver circuit 103 is further configured to determine control information 113 during the generation of recovered data symbols 111. Control information 112 may include information indicative of phase error detected during the generation of recovered data symbols 110, and control information 113 may include information indicative of phase error detected during the generation of recovered data symbols 111.

In various embodiments, multiplex circuit 105 is configured to generate output data symbols 121 by selecting either recovered data symbols 110 or recovered data symbols 111 using mode signal 120. Multiplex circuit 105 may be implemented using multiple logic gates, multiple pass-gate circuits coupled together in a wired-OR fashion, or any other suitable circuit configured to select between the two sets of recovered data symbols. It is noted that multiplex circuit 105 may be optional as, in some embodiments, a load circuit may directly receive recovered data symbols 110 and recovered data symbols 111.

Figure 2:
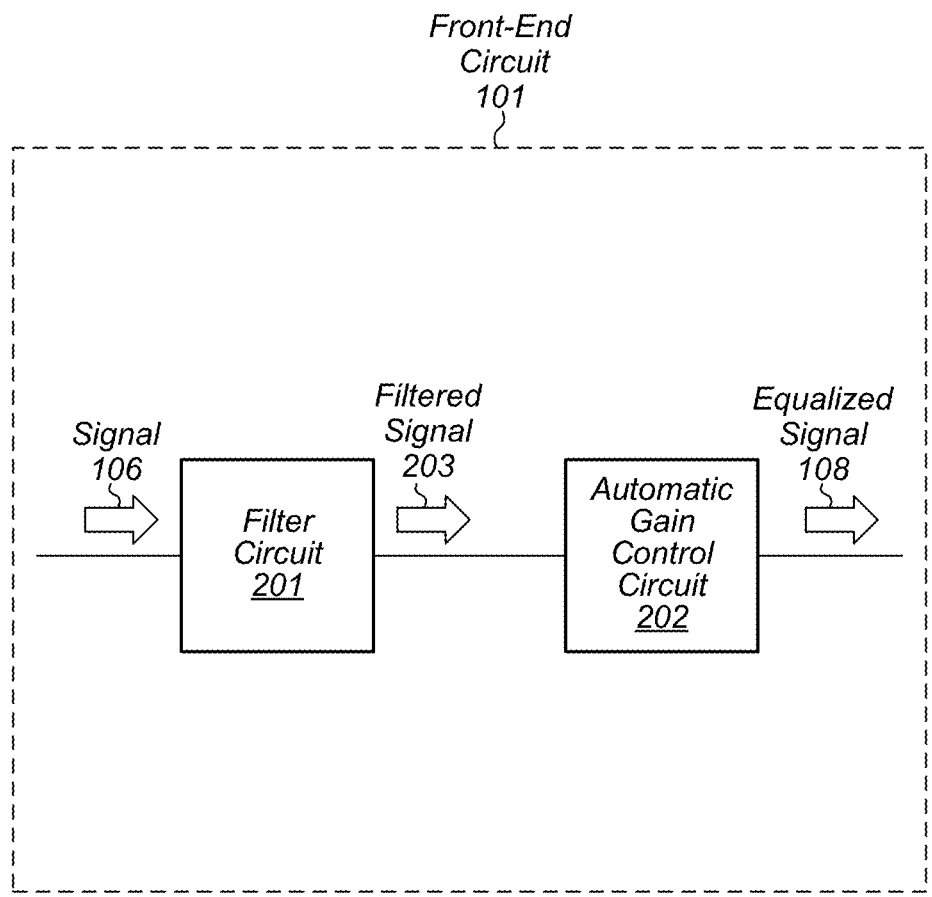
FIG. 2 is a block diagram of an embodiment of an analog front-end circuit.

Turning to FIG. 2, a block diagram of an embodiment of front-end circuit 101 is depicted. As illustrated, front-end circuit 101 includes filter circuit 201, and automatic gain control circuit 202A. Although front-end circuit 101 is depicted as generating a single equalized signal, in other embodiments, front-end circuit 101 may be configured to generate any suitable number of equalized signals using signal 106.

Filter circuit 201 is configured to generate filtered signal 203 using signal 106. In various embodiments, to generate filtered signal 203, filter circuit 201 may be further configured to attenuate high-frequency noise in signal 106. In some cases, filter circuit 201 may be further configured to attenuate low-frequency components at or near DC levels in signal 106.

Automatic gain control circuit 202 is configured to generate equalized signal 108 using filtered signal 203. In various embodiments, automatic gain control circuit 202 may be implemented as a closed-loop control circuit that uses feedback derived from equalized signal 108 to maintain the amplitude of the data symbols at an optimum level for sampling. In various embodiments, automatic gain control circuit 202 may include any suitable combination of attenuator and amplifier circuits that can be dynamically activated or de-activated to maintain the amplitude of the data symbols.

Although a single automatic gain circuits is depicted in the embodiment of FIG. 2, in other embodiments where multiple equalized signals are needed, additional automatic gain control circuits may be employed. In such cases, the additional automatic gain circuits may apply differing amounts of gain and/or attenuation for their respective equalized signals.

Figure 3:
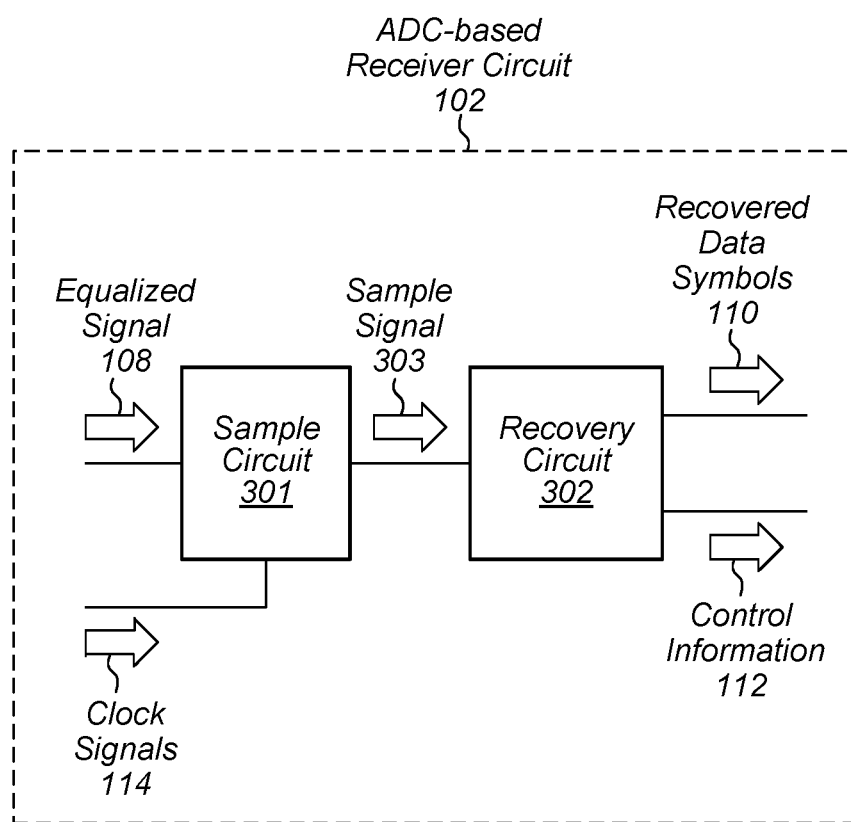
FIG. 3 is a block diagram of an embodiment of an ADC-based receiver circuit for a hybrid receiver circuit.

Turning to FIG. 3, a block diagram of an embodiment of ADC-based receiver circuit 102 is depicted. As illustrated, ADC-based receiver circuit 102 incudes sample circuit 301 and recovery circuit 302.

Sample circuit 301 is configured to generate sample signal 303 using equalized signal 108 and clock signals 114. As described below, sample circuit 301 may, in various embodiments, include multiple analog-to-digital converter circuits. In such cases, sample circuit 301 may be further configured to select, based on the baud rate of the serial data stream that includes data symbols 107, to select a first analog-to-digital converter circuit of the multiple analog-to-digital converter circuits. The first analog-to-digital converter circuit may be configured to sample equalized signal 108 using clock signals 114 to generate sample signal 303.

Sample circuit 301 may be further configured to select, based on the baud rate of the serial data stream that includes data symbols 107, a second analog-to-digital converter circuit of the multiple analog-to-digital converter circuits. The second analog-to-digital converter circuit is configured to sample equalized signal 108 using clock signals 114 to generate sample signal 303. It is noted that sample signal 303 may include a stream of multiple samples. In various embodiments, a resolution of the second analog-to-digital converter circuit is greater than a resolution of the first analog-to-digital converter circuit. As used and described herein, the resolution of an analog-to-digital converter circuit refers to a smallest incremental voltage that causes a change in the digital output of an analog-to-digital converter circuit. In some cases, a sample circuit such as sample circuit 301 may include multiple groups of analog-to-digital circuits (referred to as "sub analog-to-digital converter circuits" or "sub-ADCs") coupled in parallel and activated in a sequential fashion to increase the resolution.

Recovery circuit 302 is configured to generate recovered data symbols 110 and control information 112 using sample signal 303. To generate recovered data symbols 110 and control information 112, recovery circuit 302 may be configured to perform equalization operations such as feed-forward equalization (FFE) and decision-feedback equalization (DFE). In other embodiments, recovery circuit 302 may be further configured correct mismatch in sample signal 303, as well as multiply sample signal 303 by a gain factor. In various embodiments, recovery circuit 302 may be implemented as a digital signal processor (DSP) or other suitable processing circuit.

Figure 4:
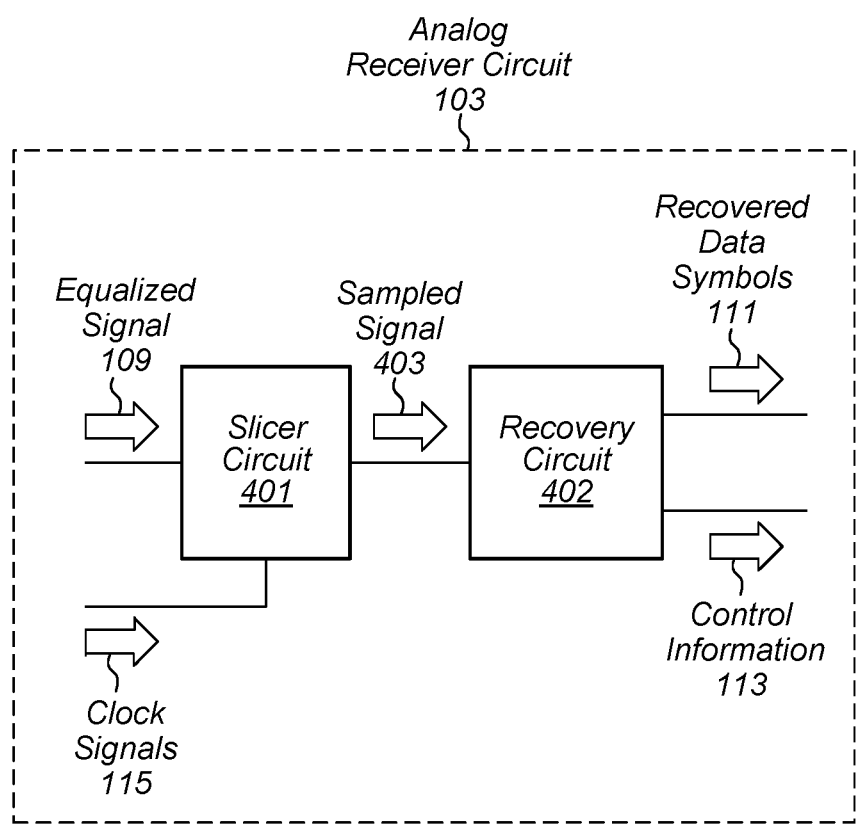
FIG. 4 is a block diagram of an embodiment of an analog receiver circuit for a hybrid receiver circuit.

Turning to FIG. 4, a block diagram of an embodiment of analog receiver circuit 103 is depicted. As illustrated, analog receiver circuit 103 includes slicer circuit 401 and recovery circuit 402.

Slicer circuit 401 is configured to generate samples using equalized signal 109 and clock signals 115. In various embodiments, slicer circuit 401 is configured to compare equalized signal 109 to multiple threshold values. Such threshold values may correspond to voltage levels associated with precursor or post cursor effects. In various embodiments, slicer circuit 401 may be further configured to generate one or more error signals that can be included in control information 113. In some embodiments, slicer circuit 401 may be further configured to perform equalization such as decision-feedback equalization (DFB).

Recovery circuit 402 is configured to generate recovered data symbols 111 and control information 113 using sampled signal 403. It is noted that sampled signal 403 may include a stream of samples generated by slicer circuit 401. To generate control information 113, recovery circuit 402 may be configured to perform phase detection. For example, in various embodiments, recovery circuit 402 may be configured to perform Mueller-Muller phase detection or Alexander phase detection. In various embodiments, recovery circuit 402 may be configured to perform such phase detection in the analog domain.

Figure 5:
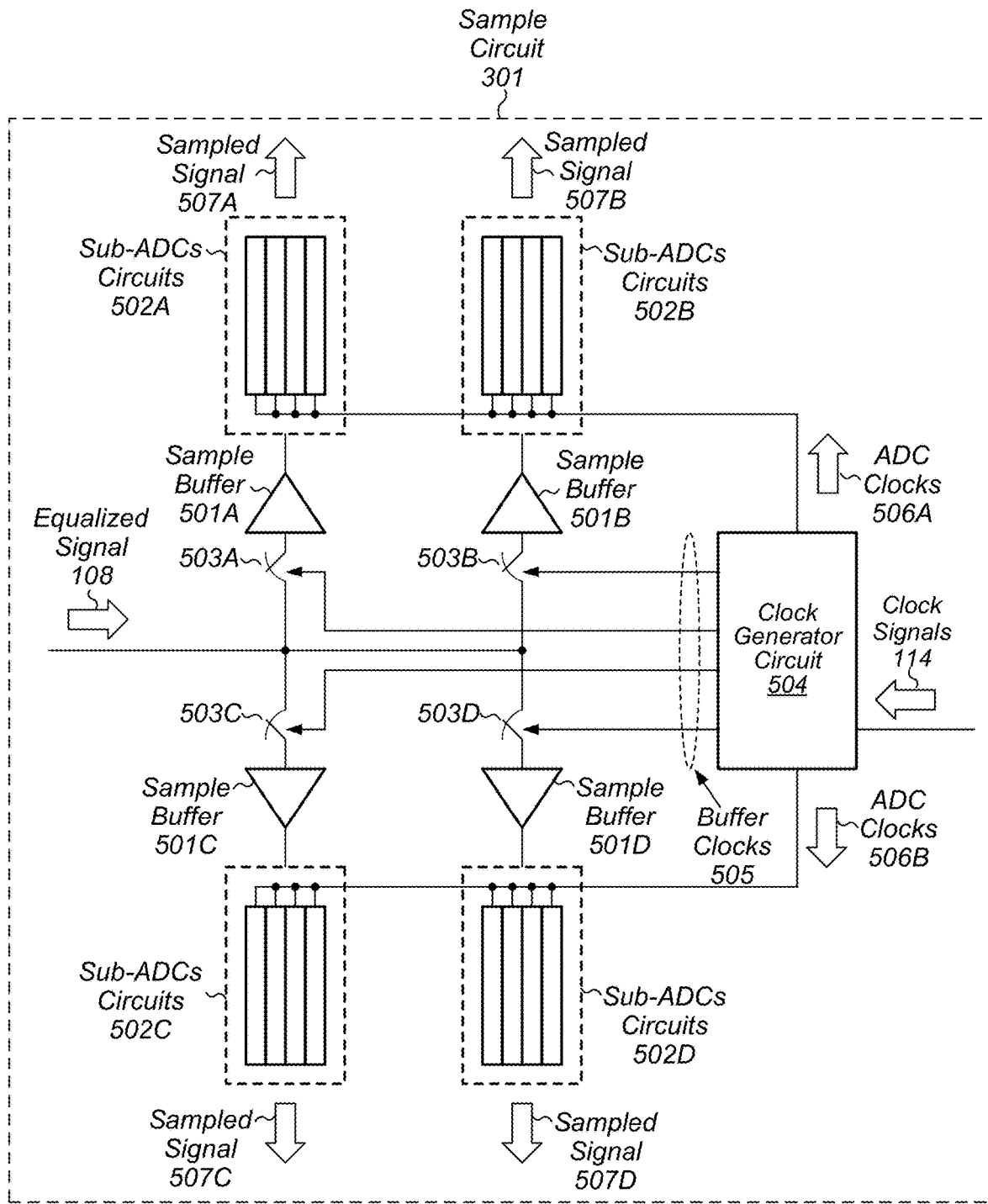
FIG. 5 is a block diagram of an embodiment of sample circuit for an ADC-based receiver circuit.

Turning to FIG. 5, an embodiment of sample circuit 301 is depicted. As illustrated, sample circuit 301 includes sample buffers 501A-501D, sub-analog-to-digital converter circuits (denoted as "sub-ADCs 502A-502D"), switches 503A-503D, and clock generation circuit 504. It is noted that although four sample buffers, four switches, and four sub-ADCs are depicted in the embodiment of FIG. 5, in other embodiments, different numbers of sample buffers, switches, and sub-ADCs may be employed.

Switches 503A-503D are configured to couple, using buffer clocks 505, equalized signal 108 to corresponding ones of sample buffers 501A-501D. In various embodiments, each of buffer clocks 505 may be phase shifted from each other such that only one of switches 503A-503D is closed at any given time. The respective frequencies of buffer clocks 505 may, in various embodiments, be based on a frequency of recovered clock signal 512, as well as the number of sample buffers and sub-ADCs included in sample circuit 301.

Switches 503A-503D may, in various embodiments, be implemented using one or more switch metal-oxide semiconductor field-effect transistors (MOSFETs), fin field-effect transistors (FinFETs), gate-all-around field-effect transistors (GAAFETs), or any other suitable switching device.

Each of sample buffers 501A-501D are configured to buffer equalized signal 108 and to drive the analog-to-digital converter circuits included in corresponding ones of sub-ADCs 502A-502D. In various embodiments, sample buffers 501A-501D may be implemented as unity-gain amplifier circuits, or any other suitable circuit configured to buffer an analog signal and provide additional drive to allow for driving multiple analog-to-digital converter circuits.

Each of sub-ADCs 502A-502D includes multiple analog-to-digital converter circuits coupled to a corresponding one of sample buffers 501A-501D and configured to generate sampled signals 507A-507D based on a voltage level of the outputs of the corresponding one of sample buffers 501A-501D. In various embodiments, sampled signals 507A-507D each include a corresponding stream of samples generated by corresponding ones of sub-ADCs 502A-502D. The analog-to-digital circuits included in a given one of sub-ADCs 502A-502D are activated in sequence by ADC clocks 506A and 506B. In various embodiments, the number of analog-to-digital converter circuits included in a sub-ADC determines an interleaving factor of the sub-ADC.

As described above, sub-ADCs 502A-502D can be activated in sequence. Once a particular one of sub-ADCs 502A-502D has been activated, the included analog-to-digital converter circuits may then be activated in sequence. In such cases, the samples generated by sub-ADCs 502A-502D may be interleaved with each other. A recovery circuit, e.g., recovery circuit 302, may be configured to correctly align the samples, as well as re-time the data to a different, and possibly slower, clock domain.

When a given analog-to-digital converter circuit is activated, it samples the output of its corresponding sample buffer. Once the output has been sampled, there may be a period of time (referred to as a "resolution period" or a "resolve period") for the analog-to-digital converter circuit to generate multiple bits whose combined value corresponds to the voltage level of the sampled output. The duration of the resolution period and the number of bits generated vary with the type of analog-to-digital circuit employed. In various embodiments, the total of the sample and resolution periods for the analog-to-digital converter circuits included in a given sub-ADC may be less than or equal to an active time of a corresponding one of buffer clocks 505.

The individual analog-to-digital converter circuits included in sub-ADCs 502A-502D may be implemented as flash ADCs, successive-approximation ADCs, or any other suitable type of analog-to-digital converter circuit. Although only four ADCs are depicted as being included in sub-ADCs 502A-502D, in other embodiments, any suitable number of analog-to-digital converter circuits can be employed. In such cases, clock generator circuit 504 would be configured to generate the necessary number of ADC clock signals.

Clock generator circuit 504 is configured to generate buffer clocks 505 and ADC clocks 506A and 506B. In various embodiments, clock generator circuit 504 may be implemented using phase-locked loop circuits, delay-locked loops circuits, delay circuits, or any other type of circuit suitable for generating multiple clock signals with different phases.

Figure 6:
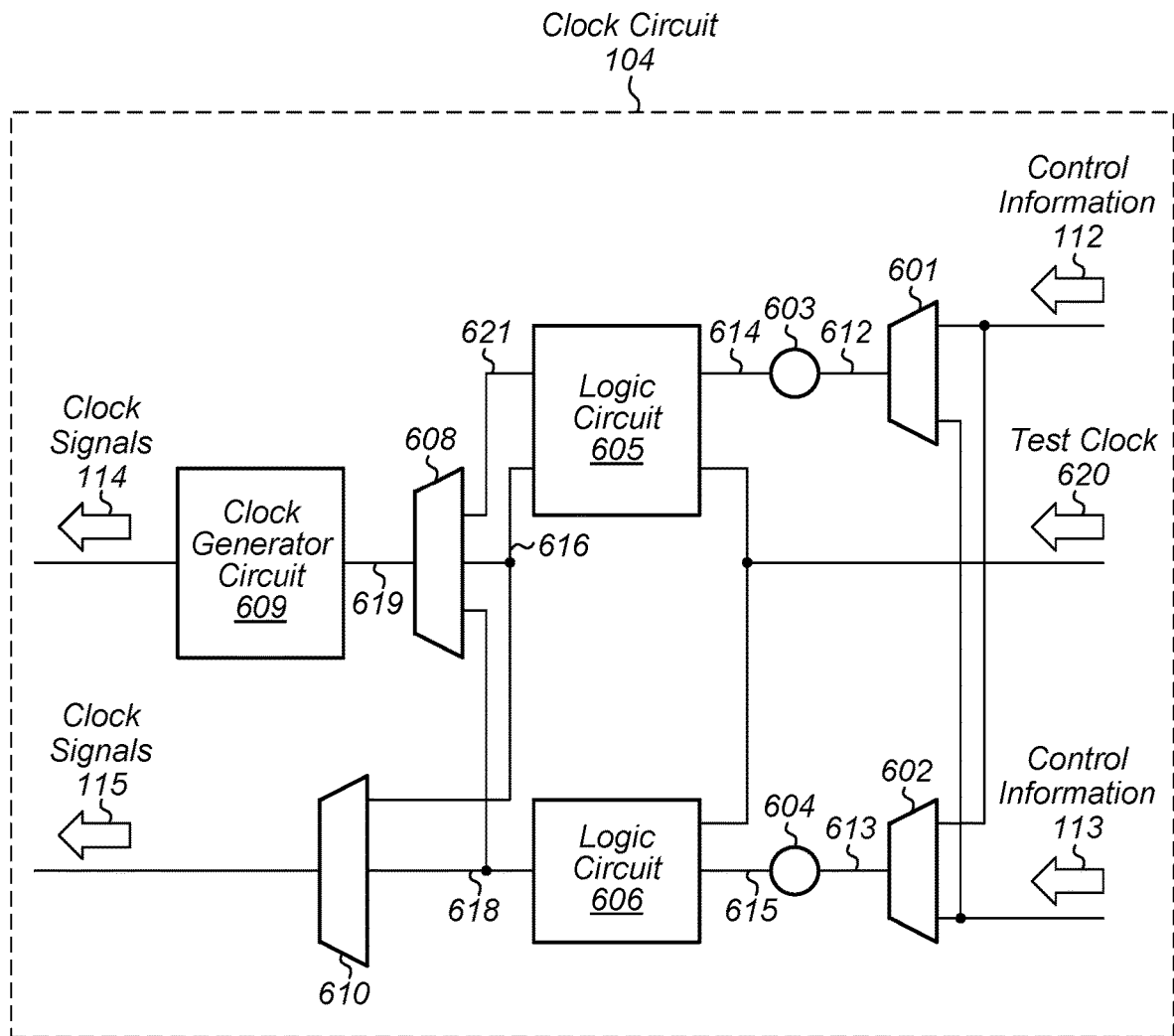
FIG. 6 is a block diagram of an embodiment of a clock circuit for a hybrid receiver circuit.

Turning to FIG. 6, a block diagram of an embodiment of clock circuit 104 is depicted. As illustrated clock circuit 104 includes multiplex circuit 601, multiplex circuit 602, oscillator circuit 603, oscillator circuit 604, logic circuit 605, logic circuit 606, multiplex circuit 608, clock generator circuit 609, and multiplex circuit 610.

Multiplex circuit 601 is configured to select one of control information 112 or control information 113 to generate a tuning signal on node 612. In various embodiments, multiplex circuit 601 may be configured to use mode signal 120 to select the one of control information 112 or control information 113. In a similar fashion, multiplex circuit 602 is configured to select one of control information 112 or control information 113 to generate a tuning signal on node 613.

In various embodiments, multiplex circuits 601 and 602 may be implemented using multiple logic gates. In other embodiments, multiplex circuits 601 and 602 may be implemented using multiple pass-gate circuits coupled together in a wired-OR fashion.

Oscillator circuit 603 is configured to generate one or more clock phases on node(s) 614 using the tuning signal on node 612. In various embodiments, oscillator circuit 603 may be an inductor-capacitor oscillator circuit (referred to as an "LC oscillator circuit"). In a similar fashion, oscillator circuit 604 is configured to generate one or more clock phases on node(s) 615 using the tuning signal on node 613. In various embodiments, oscillator circuit 604 may be implemented as a ring-oscillator circuit.

Logic circuit 605 is configured to generate one or more clock phases on node(s) 616 and node(s) 621 using the clock phases on node(s) 614 and test clock 620. In various embodiments, logic circuit 605 may be configured to use test clock 620 instead of the clock phases on node(s) 614 during a test mode. To generate the clock phases on node(s) 621 and node(s) 616, logic circuit 605 may be further configured to adjust skew of the clock phases as well as buffer the clock phases.

Logic circuit 606 is configured to generate clock phases on node(s) 618 using the clock phases on node(s) 615 and test clock 620. To generate the clock phases on node(s) 618, logic circuit 606 may be further configured to perform a frequency division using at least one clock phase of the clock phases on node(s) 615. In other embodiments, logic circuit 606 may be configured to delay one or more of the clock phases on node(s) 615 to generate the clock phases on node(s) 618.

Multiplex circuit 608 is configured to select clock phases from either node(s) 621, node(s) 616, or node(s) 618 to generate block phases on node(s) 619. In various embodiments, multiplex circuit 608 may be configured to make the selection using mode signal 120, or based on the baud rate of the serial data stream that includes data symbols 107. In various embodiments, multiplex circuit 608 may be implemented using multiple logic gates, multiple pass-gate circuits coupled together in a wired-OR fashion, or any other suitable circuit.

Clock generator circuit 609 is configured to generate clock signals 114 using the clock phases on node(s) 619. In various embodiments, a number of clock signals included in clock signals 114 may be greater than a number of clock phases on node(s) 619. In such cases, clock generator circuit 609 may be further configured to delay different ones of the clock phases on node(s) 619 to generate clock signals 114, such that individual ones of clock signals 114 have respective phase shifts.

Multiplex circuit 610 is configured to select clock phases from either node(s) 616, or node(s) 618 to generate clock signals 115. In various embodiments, multiplex circuit 610 may be configured to make the selection using mode signal 120, or based on the baud rate of the serial data stream that includes data symbols 107. In various embodiments, multiplex circuit 610 may be implemented using multiple logic gates, multiple pass-gate circuits coupled together in a wired-OR fashion, or any other suitable circuit.

Figure 7:
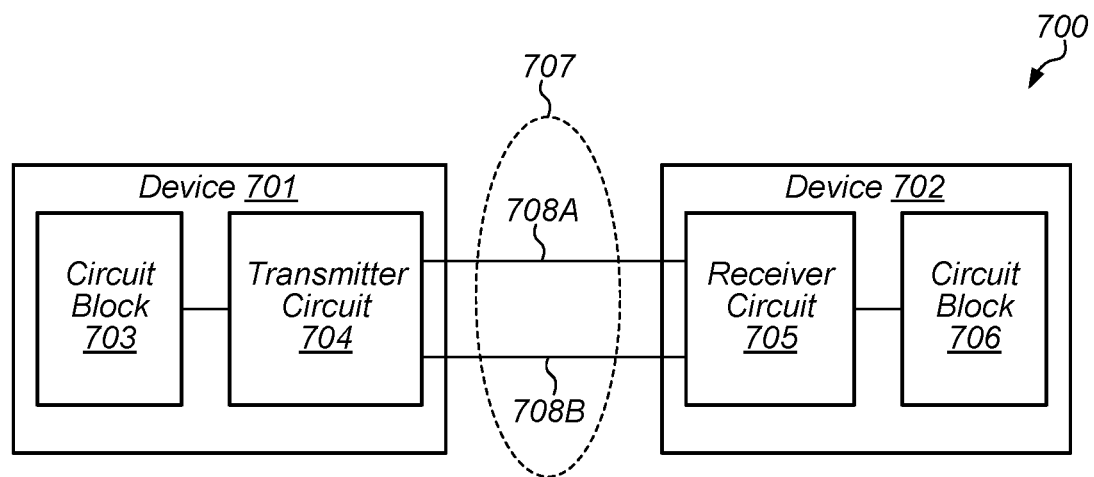
FIG. 7 is a block diagram of a computer system that includes a transmitter circuit and a receiver circuit.

As described above, a receiver circuit, such as hybrid receiver circuit 100, may be employed in a computer system. A block diagram of an embodiment of such a computer system is depicted in FIG. 7. As illustrated, computer system 700 includes devices 701 and 702, coupled by communication bus 707.

Device 701 includes circuit block 703 and transmitter circuit 704. In various embodiments, device 701 may be a processor circuit, a processor core, a memory circuit, or any other suitable circuit block that may be included on an integrated circuit in a computer system. It is noted that although device 701 only depicts a single circuit block and a single transmitter circuit, in other embodiments, additional circuit blocks and additional transmitter circuits may be employed.

Transmitter circuit 704 is configured to serially transmit signals, via communication bus 707, corresponding to data received from circuit block 703. Such signals may differentially encode one or more bits such that a difference between the respective voltage levels of wires 708A and 708B, at a particular point in time, correspond to a particular bit value. In some cases, the generation of the signals may include encoding the bits prior to transmission. It is noted that although communication bus 707 is depicted as including two wires, in other embodiments, any suitable number of wires may be employed.

Device 702 includes receiver circuit 705 and circuit block 706. Like device 701, device 702 may be a processor circuit, a processor core, a memory circuit, or any other suitable circuit block configured to receive data from transmitter circuit 704. In various embodiments, receiver circuit 705 may correspond to hybrid receiver circuit 100 as depicted in FIG. 1.

Devices 701 and 702 may, in some embodiments, be fabricated on a common integrated circuit. In other embodiments, devices 701 and 702 may be located on different integrated circuits mounted on a common substrate or circuit board. In such cases, communication bus 707 may include metal or other conductive traces on the substrate or circuit board. Although only two devices are depicted in computer system 700, in other embodiments, any suitable number of devices may be employed.

Figure 8:
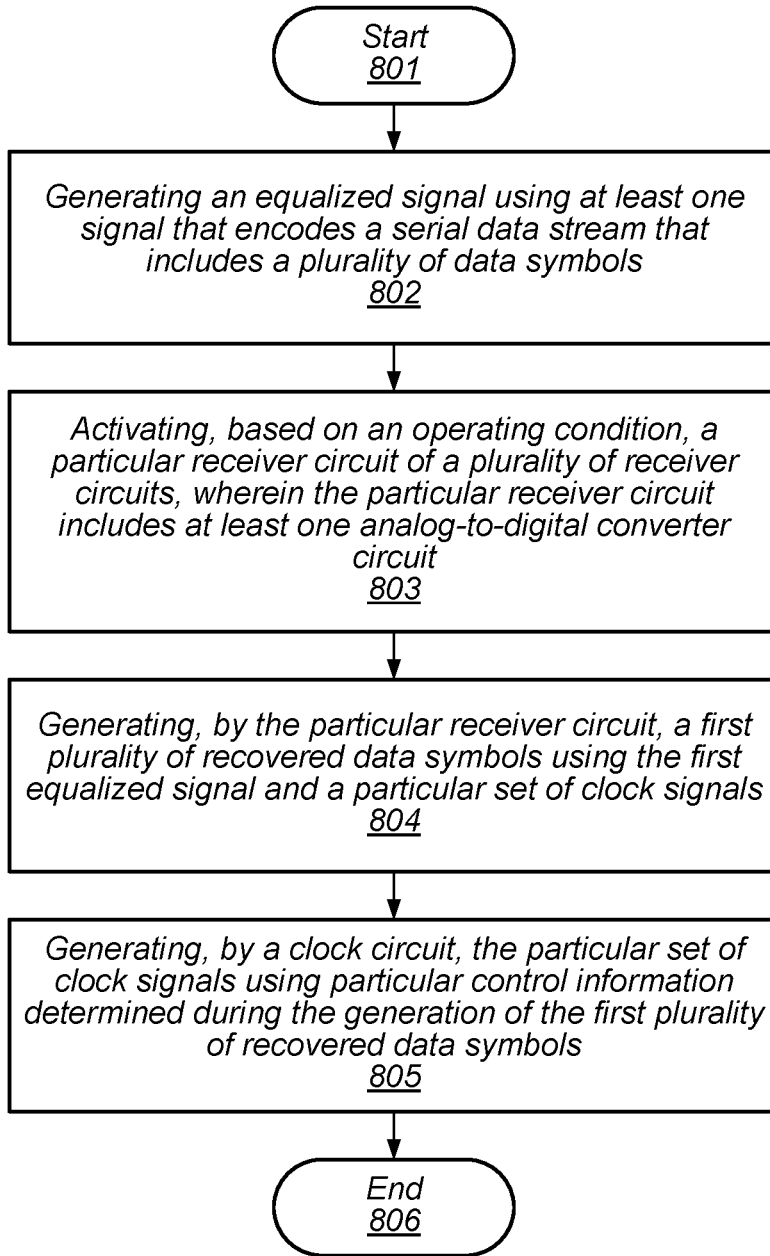
FIG. 8 is a flow diagram of an embodiment of a method for operating a hybrid receiver circuit.

Turning to FIG. 8, a flow diagram depicting an embodiment of a method for operating a hybrid receiver circuit is illustrated. The method, which may be applied to various hybrid receiver circuits such as hybrid receiver circuit 100, begins in block 801.

The method includes generating an equalized signal using at least one signal that encode a serial data stream that includes a plurality of data symbols (block 802). In some embodiments, generating the equalized signal includes filtering the plurality of signals to generate a filtered signal. In such cases, the method can include buffering, with a gain factor, the filtered signal to generate the equalized signal. In various embodiments, the method may further include generating a plurality of equalized signal using the at least one signal.

The method also includes activating, based on an operating condition, a particular receiver circuit of a plurality of receiver circuits, wherein the particular receiver circuit includes at least one analog-to-digital converter circuit (block 803). In various embodiments, the plurality of receiver circuits includes multiple ADC-based receiver circuits and multiple analog receiver circuits that are activated in response to detecting corresponding operating conditions. As used and defined herein an operation condition refers to a set of physical and electrical parameters that affect the transmission of a signal that encodes a serial data stream as well as characteristics of the signal itself. For example, a particular operating condition may include the baud rate of the serial data stream as well as electrical characteristics (e.g., impedance) of a channel through which the serial data stream is transmitted. In various embodiments, activating, based on the baud rate of the serial data stream, the particular receiver circuit includes performing a comparison of the baud rate of the serial data stream to a threshold value, and activating the particular receiver circuit in response to determining the baud rate of the serial data stream is greater than the threshold value.

In some embodiments, the method also includes activating, in response to detecting a different operating condition, a different receiver circuit of a plurality of receiver circuits that includes an analog receiver circuit. In such cases, the method may also include generating, by the different receiver circuit, a second plurality of recovered data symbols using the second equalized signal and a different set of clock signals, and generating, by the clock circuit, the different set of clock signals using different control information determined during the generation of the second plurality of recovered data symbols.

In other embodiments, activating, in response to detecting the different operating conditions, includes receiving, by the different receiver circuit, baud rate information for the serial data stream. In various embodiments, the different receiver circuit may receive the baud rate information during an initialization or startup procedure associated with a communication channel. In such cases, the method may also include deactivating the particular receiver circuit in response to detecting the different operating conditions.

The method further includes generating, by the particular receiver circuit, a first plurality of recovered data symbols using the first equalized signal and a particular set of clock signals (block 804). In some embodiments, the particular receiver circuit includes a plurality of analog-to-digital converter circuits. In such cases, generating, by the particular receiver circuit, the first plurality of recovered data symbols includes selecting, based on the baud rate of the serial data stream, a first analog-to-digital converter circuit of the plurality of analog-to-digital converter circuits, and sampling, by the first analog-to-digital converter circuit, the first equalized signal using the particular set of clock signals to generate a plurality of samples. The method may also include generating the first plurality of recovered data symbols using the plurality of samples.

In other embodiments, the method may further include selecting, based on the baud rate of the serial data stream, a second analog-to-digital converter circuit of the plurality of analog-to-digital converter circuits. In various embodiments, a resolution of the second analog-to-digital converter circuit is greater than a resolution of the first analog-to-digital converter circuit. In such cases, the method also includes sampling, by the second analog-to-digital converter circuit, the first equalized signal using the particular set of clock signals to generate a plurality of interleaved samples, and generating the first plurality of recovered data symbols using the plurality of interleaved samples.

The method also includes generating, by a clock circuit, the particular set of clock signals using particular control information determined during the generation of the first plurality of recovered data symbols (block 805). In some embodiments, the clock circuit can include a plurality of oscillator circuits. In such cases, generating the particular set of clock signals includes adjusting a frequency of at least one oscillator circuit of the plurality of oscillator circuits using the particular control information. The method concludes in block 806.

Figure 9:
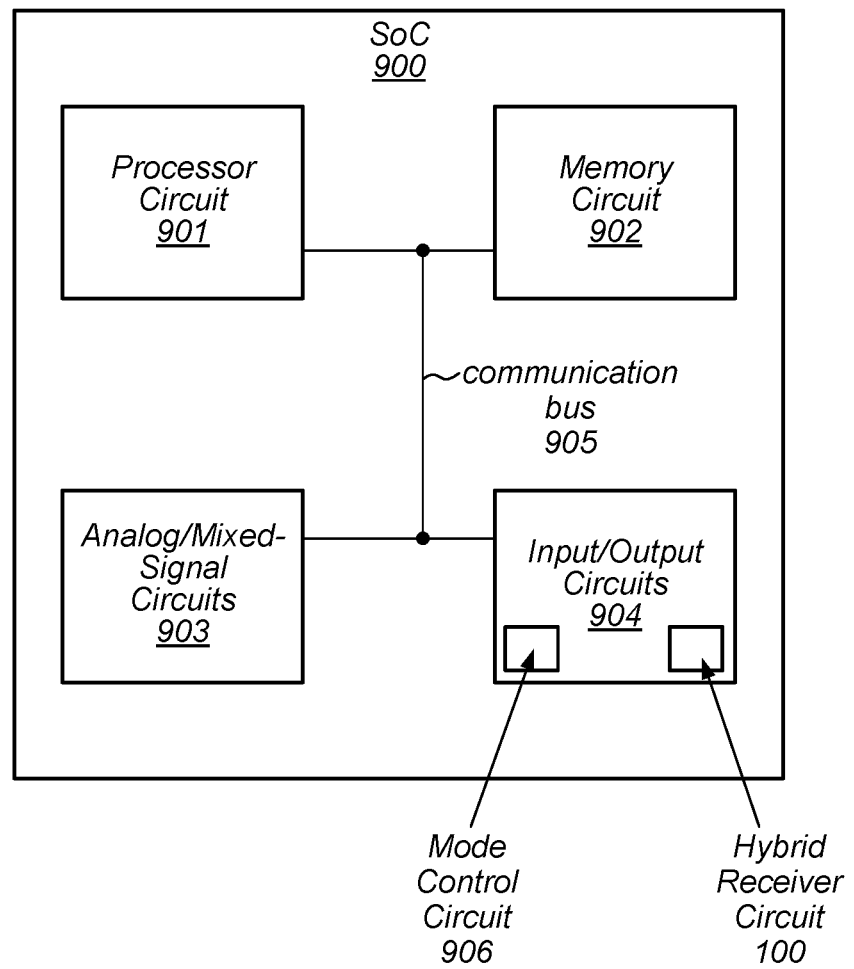
FIG. 9 is a block diagram of one embodiment of a system-on-a-chip that includes a receiver circuit.

A block diagram of a system-on-a-chip (SoC) is illustrated in FIG. 9. In the illustrated embodiment, SoC 900 includes processor circuit 901, memory circuit 902, analog/mixed-signal circuits 903, and input/output circuits 904 each of which is coupled to communication bus 905. In various embodiments, SoC 900 may be configured for use in a desktop computer, server, or in a mobile computing application such as, e.g., a tablet, laptop computer, or wearable computing device.

Processor circuit 901 may, in various embodiments, be representative of a general-purpose processor that performs computational operations. For example, processor circuit 901 may be a central processing unit (CPU) such as a microprocessor, a microcontroller, an application-specific integrated circuit (ASIC), or a field-programmable gate array (FPGA).

Memory circuit 902 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although a single memory circuit is illustrated in FIG. 9, in other embodiments, any suitable number of memory circuits may be employed.

Analog/mixed-signal circuits 903 may include a crystal oscillator circuit, a phase-locked loop (PLL) circuit, an analog-to-digital converter (ADC) circuit, and a digital-to-analog converter (DAC) circuit (all not shown). In other embodiments, analog/mixed-signal circuits 903 may be configured to perform power management tasks with the inclusion of on-chip power supplies and voltage regulators.

Input/output circuits 904 may be configured to coordinate data transfer between SoC 900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 904 may be configured to implement a version of Universal Serial Bus (USB) protocol or IEEE 1394 (Firewire®) protocol, and include hybrid receiver circuit 100 as depicted in the embodiment of FIG. 1. In such cases, input/output circuits 904 may also include mode control circuit 906 configured to generate mode signal 120. In some case, mode control circuit 906 may be configured to set a value of mode signal 120 based on a rate at which data is being received by hybrid receiver circuit 100. In other cases, mode control circuit 906 may be configured to set the value of mode signal 120 during an initialization or boot operation of SoC 900.

Input/output circuits 904 may also be configured to coordinate data transfer between SoC 900 and one or more devices (e.g., other computing systems or integrated circuits) coupled to SoC 900 via a network. In one embodiment, input/output circuits 904 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 904 may be configured to implement multiple discrete network interface ports.

Figure 10:
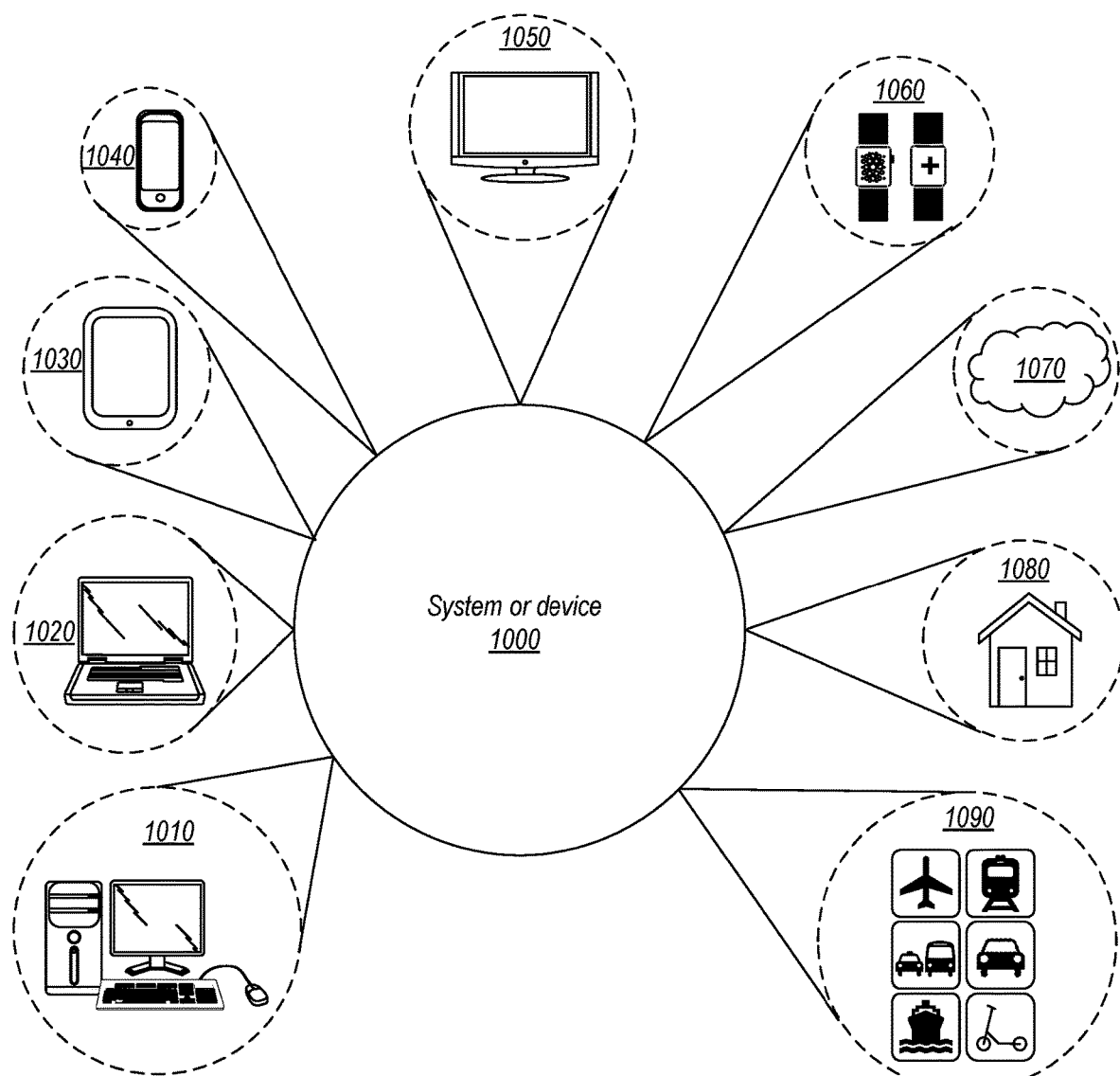
FIG. 10 is a block diagram of various embodiments of computer systems that may include receiver circuits.

Turning now to FIG. 10, various types of systems that may include any of the circuits, devices, or systems discussed above are illustrated. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Figure 11:
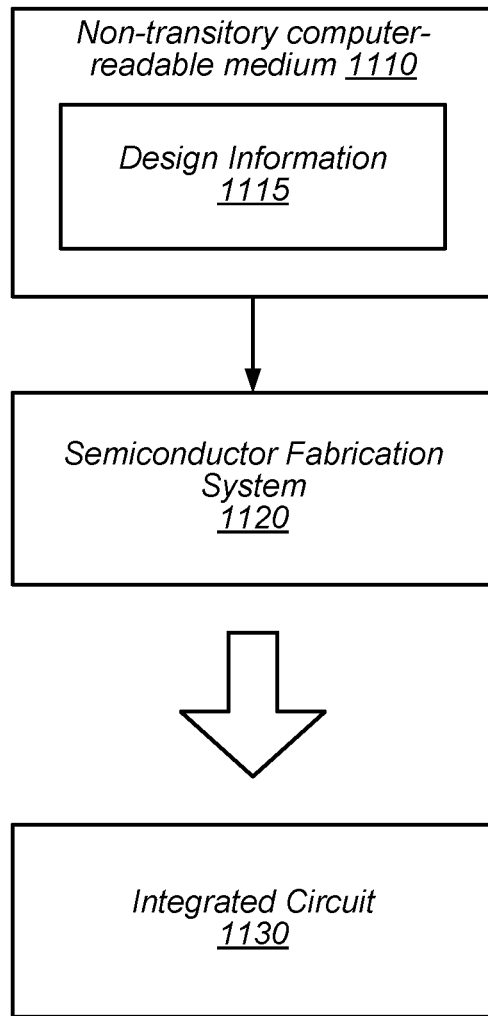
FIG. 11 illustrates an example of a non-transitory computer-readable storage medium that stores circuit design information.

FIG. 11 is a block diagram illustrating an example of a non-transitory computer-readable storage medium that stores circuit design information, according to some embodiments. In the illustrated embodiment, semiconductor fabrication system 1120 is configured to process the design information 1115 stored on non-transitory computer-readable storage medium 1110 and fabricate integrated circuit 1130 based on the design information 1115.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums, which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system, such as semiconductor fabrication system 1120, for example. In some embodiments, design information 1115 may include a netlist that specifies elements of a cell library, as well as their connectivity. One or more cell libraries used during logic synthesis of circuits included in integrated circuit 1130 may also be included in design information 1115. Such cell libraries may include information indicative of device or transistor level netlists, mask design data, characterization data, and the like, of cells included in the cell library.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown or described herein. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
 a front-end circuit configured to generate an equalized signal using at least one signal that encodes a serial data stream that includes a plurality of data symbols;
 an ADC-based receiver circuit that includes a plurality of analog-to-digital converter circuits, wherein the ADC-based receiver circuit is configured, based on a baud rate of the serial data stream, to generate a first plurality of recovered data symbols using the equalized signal and a plurality of first clock signals;
 a first analog receiver circuit configured, based on the baud rate of the serial data stream, to generate a second plurality of recovered data symbols using the equalized signal and a plurality of second clock signals; and
 a multiplex circuit configured to select, based on the baud rate of the serial data stream, either the first plurality of recovered data symbols or the second plurality of recovered data symbols to generate a plurality of output data symbols.

2. The apparatus of claim 1, further comprising a clock circuit configured to:
 generate the plurality of first clock signals using first control information determined during a generation of the first plurality of recovered data symbols; and
 generate the plurality of second clock signals using second control information determined during a generation of the second plurality of recovered data symbols.

3. The apparatus of claim 2, wherein the clock circuit is further configured to:
 receive baud rate information for the serial data stream; and
 generate, in response to a determination that the baud rate information matches a particular value, the plurality of first clock signals using first control information determined during the generation of the first plurality of recovered data symbols, otherwise generate the plurality of second clock signals using second control information determined during the generation of the second plurality of recovered data symbols.

4. The apparatus of claim 1, wherein to generate the first plurality of recovered data symbols, the ADC-based receiver circuit is further configured to select, based on the baud rate of the serial data stream, a first analog-to-digital converter circuit of the plurality of analog-to-digital converter circuits;
 wherein the first analog-to-digital converter circuit is configured to sample the equalized signal using the plurality of first clock signals to generate a first plurality of samples; and
 wherein the ADC-based receiver circuit is further configured to generate the first plurality of recovered data symbols using the first plurality of samples.

5. The apparatus of claim 4, wherein the ADC-based receiver circuit is further configured to select, based on the baud rate of the serial data stream, a second analog-to-digital converter circuit of the plurality of analog-to-digital converter circuits, wherein a second resolution of the second analog-to-digital converter circuit is greater than a first resolution of the first analog-to-digital converter circuit;
 wherein the second analog-to-digital converter circuit is further configured to sample the equalized signal using the plurality of first clock signals to generate a second plurality of samples, wherein the second plurality of samples are interleaved; and
 wherein the ADC-based receiver circuit is further configured to generate the first plurality of recovered data symbols using the second plurality of samples.

6. The apparatus of claim 1, further comprising a second analog receiver circuit configured, based on the baud rate of the serial data stream, to generate a third plurality of recovered data symbols using the equalized signal and a plurality of third clock signals.

7. A method, comprising:
 generating an equalized signal using at least one signal that encodes a serial data stream that includes a plurality of data symbols;
 activating, in response to determining a baud rate of the serial data stream has a first value, a particular receiver circuit of a plurality of receiver circuits, wherein the particular receiver circuit includes at least one analog-to-digital converter circuit;

generating, by the particular receiver circuit, a first plurality of recovered data symbols using the equalized signal and a particular set of clock signals;

activating, in response to determining the baud rate of the serial data stream has a second value different than the first value, a different receiver circuit of a subset of the plurality of receiver circuits that include corresponding analog receiver circuits;

generating, by the different receiver circuit, a second plurality of recovered data symbols using the equalized signal and a different set of clock signals; and selecting, based on the baud rate of the serial data stream, either of the first plurality of recovered data symbols or the second plurality of recovered data symbols to generate a plurality of output data symbols.

8. The method of claim 7, further comprising generating, by a clock circuit, the particular set of clock signals using particular control information determined during the generation of the first plurality of recovered data symbols.

9. The method of claim 8, further comprising generating, by the clock circuit, the different set of clock signals using different control information determined during the generation of the second plurality of recovered data symbols.

10. The method of claim 8, wherein the clock circuit includes a plurality of oscillator circuits, and wherein generating the particular set of clock signals includes adjusting a frequency of at least one oscillator circuit of the plurality of oscillator circuits using the particular control information.

11. The method of claim 10, further comprising receiving information indicative of the baud rate of the serial data stream.

12. The method of claim 7, wherein the particular receiver circuit includes a plurality of analog-to-digital converter circuits, and wherein generating, by the particular receiver circuit, the first plurality of recovered data symbols includes:
selecting, based on the baud rate of the serial data stream, a first analog-to-digital converter circuit of the plurality of analog-to-digital converter circuits;
sampling, by the first analog-to-digital converter circuit, the equalized signal using the particular set of clock signals to generate a first plurality of samples; and
generating the first plurality of recovered data symbols using the first plurality of samples.

13. The method of claim 12, further comprising:
selecting, based on the baud rate of the serial data stream, a second analog-to-digital converter circuit of the plurality of analog-to-digital converter circuits, wherein a second resolution of the second analog-to-digital converter circuit is greater than a first resolution of the first analog-to-digital converter circuit;
sampling, by the second analog-to-digital converter circuit, the equalized signal using the particular set of clock signals to generate a second plurality of samples, wherein samples included in the second plurality of samples are interleaved; and
generating the first plurality of recovered data symbols using the second plurality of samples.

14. An apparatus, comprising:
a first device that includes a first functional circuit block, wherein the first device is configured to:
receive, from the first functional circuit block, a serial data stream that includes a plurality of data symbols;
generate a plurality of signals that encode the serial data stream; and
transmit the plurality of signals via a communication channel; and a second device that includes a plurality of receiver circuits, wherein the second device is configured to:
receive the plurality of signals via the communication channel;
generate an equalized signal using the plurality of signals;
activate, based on a baud rate of the serial data stream, a particular receiver circuit of the plurality of receiver circuits, wherein the particular receiver circuit includes at least one analog-to-digital converter circuit;
generate, by the particular receiver circuit, a first plurality of recovered data symbols using the equalized signal and a particular set of clock signals;
activate, based on the baud rate of the serial data stream, a different receiver circuit of a subset of the plurality of receiver circuits that include corresponding analog receiver circuits;
generate, by the different receiver circuit, a second plurality of recovered data symbols using the equalized signal and a different set of clock signals; and
select, based on the baud rate of the serial data stream, either the first plurality of recovered data symbols or the second plurality of recovered data symbols to generate a plurality of output data symbols.

15. The apparatus of claim 14, wherein the second device is further configured to generate the particular set of clock signals using particular control information determined during a generation of the first plurality of recovered data symbols.

16. The apparatus of claim 15, wherein the second device includes a plurality of oscillator circuits, and wherein to generate the particular set of clock signals, the second device is further configured to adjust a frequency of at least one oscillator circuit of the plurality of oscillator circuits using the particular control information.

17. The apparatus of claim 15, wherein the second device is further configured to generate the different set of clock signals using different control information determined during a generation of the second plurality of recovered data symbols.

18. The apparatus of claim 17, wherein the second device is further configured to receive information indicative of the baud rate of the serial data stream.

19. The apparatus of claim 18, wherein the particular receiver circuit includes a plurality of analog-to-digital converter circuits, and wherein to generate the first plurality of recovered data symbols, the particular receiver circuit is further configured to:
select, based on the baud rate of the serial data stream, a first analog-to-digital converter circuit of the plurality of analog-to-digital converter circuits;
wherein the first analog-to-digital converter circuit is configured to sample the equalized signal using the particular set of clock signals to generate a first plurality of samples; and
wherein the particular receiver circuit is further configured to generate the first plurality of recovered data symbols using the first plurality of samples.

20. The apparatus of claim 19, wherein the particular receiver circuit is further configured to select, based on the baud rate of the serial data stream, a second analog-to-digital converter circuit of the plurality of analog-to-digital converter circuits, wherein a second resolution of the second analog-to-digital converter circuit is greater than a first resolution of the first analog-to-digital converter circuit; and wherein the second analog-to-digital converter circuit is configured to sample the equalized signal using the particular set of clock signals to generate a second plurality of samples, wherein samples included in the second plurality of samples are interleaved; and wherein the particular receiver circuit is further configured to generate the first plurality of recovered data symbols using the second plurality of samples.

\* \* \* \* \*